United States Patent
Broyles et al.

(10) Patent No.: US 11,943,171 B2
(45) Date of Patent: Mar. 26, 2024

(54) ASSIGNING PHYSICAL BLOCK RESOURCES

(71) Applicant: T-MOBILE INNOVATIONS LLC, Overland Park, KS (US)

(72) Inventors: Daniel Stewart Broyles, Olathe, KS (US); Nagi A. Mansour, Arlington, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/563,363

(22) Filed: Dec. 28, 2021

(65) Prior Publication Data

US 2023/0208602 A1 Jun. 29, 2023

(51) Int. Cl.
*H04W 72/04* (2023.01)
*H04L 5/00* (2006.01)
*H04W 72/044* (2023.01)
*H04W 72/53* (2023.01)

(52) U.S. Cl.
CPC ......... *H04L 5/0071* (2013.01); *H04W 72/044* (2013.01); *H04W 72/53* (2023.01)

(58) Field of Classification Search
None
See application file for complete search history.

(56) References Cited

U.S. PATENT DOCUMENTS

| | | | |
|---|---|---|---|
| 8,934,918 B1 * | 1/2015 | Naim | H04W 72/53 455/452.2 |
| 9,705,660 B1 * | 7/2017 | Naim | H04W 72/53 |
| 2012/0058794 A1 * | 3/2012 | Valentine | H04W 48/10 455/509 |
| 2014/0133411 A1 * | 5/2014 | Park | H04L 5/0058 370/329 |
| 2015/0119064 A1 * | 4/2015 | Takano | H04W 16/14 455/454 |
| 2018/0115907 A1 * | 4/2018 | Damnjanovic | H04W 72/1215 |
| 2019/0386807 A1 * | 12/2019 | Kazmi | H04L 5/0094 |
| 2021/0091897 A1 * | 3/2021 | Gheorghiu | H04W 48/16 |
| 2021/0185699 A1 * | 6/2021 | Alasti | H04W 72/566 |
| 2021/0194648 A1 * | 6/2021 | Bassirat | H04W 76/10 |
| 2022/0150894 A1 * | 5/2022 | Furuichi | H04W 72/0453 |

FOREIGN PATENT DOCUMENTS

| | | | | |
|---|---|---|---|---|
| CN | 114363967 A | * | 4/2022 | H04L 5/0005 |
| CN | 110636610 B | * | 8/2022 | H04L 5/0005 |
| CN | 115515238 A | * | 12/2022 | H04L 5/0005 |
| CN | 115515239 A | * | 12/2022 | H04L 5/0005 |
| EP | 3454497 A1 | * | 3/2019 | H04L 5/0007 |
| EP | 3454497 B1 | * | 5/2021 | H04L 5/0007 |
| WO | WO-2013183332 A1 | * | 12/2013 | H04B 7/2621 |
| WO | WO-2017039496 A1 | * | 3/2017 | |
| WO | WO-2022152906 A1 | * | 7/2022 | |

* cited by examiner

*Primary Examiner* — Kodzovi Acolatse
(74) *Attorney, Agent, or Firm* — Shook, Hardy, & Bacon L.L.P.

(57) ABSTRACT

Systems and methods are provided for dynamically assigning physical resource blocks (PRBs) based on available bandwidth. At least a first amount of bandwidth that is carrier controlled is determined. A standardized bandwidth that is greater than the first amount of bandwidth is determined. A bandwidth differential is determined as the difference between he standardized bandwidth and the first amount of bandwidth. Then, PRBs are assigned corresponding to the first amount of bandwidth while zero PRBs are assigned to the bandwidth differential.

15 Claims, 6 Drawing Sheets

ASSIGNING PHYSICAL BLOCK RESOURCES

TECHNICAL FIELD

The present invention relates to the use of systems and methods for assigning physical resource blocks based on available bandwidth to optimize the use of the physical resource blocks owned by a carrier, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for assigning physical resource blocks based on available bandwidth in order to optimize the utilization of physical resource blocks owned by a carrier. Previously, physical resource blocks (PRBs) were assigned based upon standardized bandwidths. As such, if an operator wanted to utilize a non-standard amount of bandwidth on a spectrum, the operator was limited to only being able to use a standard amount. For example, if a carrier owns 7 Mhz of contiguous bandwidth, only 5 Mhz of that bandwidth could be utilized since 5 Mhz and 10 Mhz are standard bandwidth amounts. As such, 2 Mhz of the 7 Mhz of bandwidth that is carrier owned would remain unused. Additionally, the larger 10 Mhz standard bandwidth could not be assigned, since 3 Mhz of that would not be carrier owned or controlled. Using bandwidth that is not carrier owned or operated would cause interference and would not be permitted.

In the past, if a non-standard bandwidth was desired, a carrier would need to request approval via a lengthy process managed by a governing entity. Such non-standard bandwidth requests are costly to make and implement on chipsets and software and increase the complexity of assigning physical resource blocks and maximizing utilization of carrier owned resources. As such, carrier-owned or carrier-controlled portions of a spectrum would go unutilized. Therefore, a system which would allow for the use of the full 7 Mhz that is carrier-owned or carrier-controlled would increase speeds and reduce the need for aggregation.

The present disclosure addresses this problem by determining a standard bandwidth that is greater than a first amount of bandwidth that is carrier controlled or owned and then computing a bandwidth differential, which is the difference between the standardized bandwidth and the first amount of bandwidth. Based on this, PRBs are assigned to the first amount of bandwidth, but not to the bandwidth differential. Additionally, the disclosure provides for PRB aggregation which allows a scheduler to allocate PRBs from non-contiguous parts of bandwidth that are owned by a carrier, further optimizing the use of PRBs controlled or owned by a carrier.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In aspects, a UE provides location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

The present disclosure is directed to systems, methods, and computer readable media for scheduling PRBs in non-standard channel sizes. Generally, a scheduling component is configured to perform several operations, including assigning resources to users out of a set of PRBs. The number and size of PRBs available is predetermined based upon the size of bandwidth owned or controlled by an individual carrier. The bandwidths available for selection are based on standardized amounts. For example, the PRBs available may be in increments of 5 MHz (e.g. 5 MHz, 10 Mhz, 15 MHz, etc.). A wireless carrier may own or control noncontiguous and contiguous portions of a spectrum.

Normally, an operator instructs the scheduler or scheduling component to use a standard size up to the largest contiguous bandwidth that meets one of the standard amounts. For example, if a carrier operates or owns 7 MHz contiguously in a spectrum, the scheduler can use a 5 MHz block of the 7 MHz since 5 MHz is a standard bandwidth size. Therefore PRBs would be allocated for the 5 MHz standard bandwidth. A larger standard bandwidth, such as 10 MHz cannot be assigned because 3 MHz would then be assigned that are not owned or controlled by the wireless carrier. Utilizing the 3 MHz not owned or controlled by the wireless carrier would then cause interference or would not be permitted.

As discussed herein, the present disclosure also provides the ability to identify PRBs that cannot be used or must be avoided in order to prevent interference. Additionally, the present disclosure provides systems and methods that allow the scheduler to allocate PRBs from non-contiguous parts of a carrier owned or controlled spectrum at the same time to a given user. This PRB aggregation allows a carrier to utilize more of the spectrum owned or controlled by the carrier, increase speeds, and reduce the need for carrier aggregation.

A first aspect of the disclosure is directed to a system for scheduling PRBs in non-standard sizes that comprises a scheduling component and a radio component. The scheduling component or a subcomponent within the scheduling component selects a first segment of the spectrum that is available to a wireless carrier for wirelessly communicating with one or more user devices. The first segment of the spectrum has a first bandwidth that is determined to be between a lower standardized carrier bandwidth and an upper standardized carrier bandwidth. The system then determines a first bandwidth differential that is a difference between the upper standardized carrier bandwidth and the first of bandwidth. Based on the determination, a plurality of physical resource blocks are scheduled to be allocated for at least a portion of the first bandwidth while no physical resource blocks are scheduled to be allocated for the first bandwidth differential. The schedule of allocation of the plurality of PRBs to a radio component are communicated. The radio component is configured to wirelessly communicate the plurality of resource blocks to one or more user devices. In aspects, the first bandwidth differential corresponds to a second segment of the spectrum that is not available to the wireless carrier.

In another aspect, a method for assigning PRBs based on available bandwidth is disclosed. In this aspect, a first amount of bandwidth that is carrier-controlled is determined. Then, a standardized bandwidth that is greater than the first amount of bandwidth is determined. A bandwidth differential that is a difference between the standardized bandwidth and the first amount of bandwidth is computed and then PRBs are assigned corresponding to the first amount of bandwidth without assigning PRBs corresponding to the bandwidth differential. The bandwidth differential corresponds to a second amount of bandwidth that is not carrier-controlled. For example, the standardized bandwidth may be 10 MHz and the first amount of bandwidth that is carrier-controlled is determined to be 7 MHz. As such, the bandwidth differential determined is 3 Mhz. In this aspect, no PRBs will be assigned to the bandwidth differential or the 3 MHz. By contrast, all 7 Mhz of the first amount of bandwidth are assigned PRBs. This is an improvement to prior technology, which would have only allowed the standard 5 MHz of the 7 Mhz of the first amount of bandwidth to be assigned PRBs. As a result, a greater amount of carrier-controlled bandwidth can be utilized. In aspects, the first amount of bandwidth and the second amount of bandwidth are located adjacent to one another within a first spectrum. In other aspects, it is contemplated that the first amount of bandwidth and the second amount of bandwidth may not be located adjacent to one another within the first spectrum and may be separated by portions of bandwidth that are owned or operated by another carrier.

In yet another aspect, another method for scheduling PRBs in non-standard channel sizes is disclosed. A first amount and a second amount of bandwidth that are carrier-controlled are determined. For the first amount of bandwidth, a first standardized bandwidth that is greater than the first amount of bandwidth is determined. Then, for the second amount of bandwidth, a second standardized bandwidth that is greater than the second amount of bandwidth is determined. Then, a first bandwidth differential that is a difference between the first standardized bandwidth and the first amount of bandwidth is computed. Similarly, a second bandwidth differential that is a difference between the second standardized bandwidth and the second amount of bandwidth is also computed. Based on these computations, PRBs are assigned corresponding to the first amount and the second amount of bandwidth without assigning PRBs corresponding to the first bandwidth differential and the second bandwidth differential. Additionally, the first amount and the second amount of bandwidth may be aggregated. In aspects, the first amount and the second amount of bandwidth may be noncontiguous portions of bandwidth. In aspects, the first standardized bandwidth and second standardized bandwidths are one or more of 5 MHz, 10 MHz, 15 MHz, and 20 MHz. However, in other aspects, standardized bandwidths may be any increment of bandwidth that is established as standard by the applicable governing body. Additionally, the first bandwidth differential and the second bandwidth differential correspond to bandwidth not controlled by the carrier.

Figure 1:
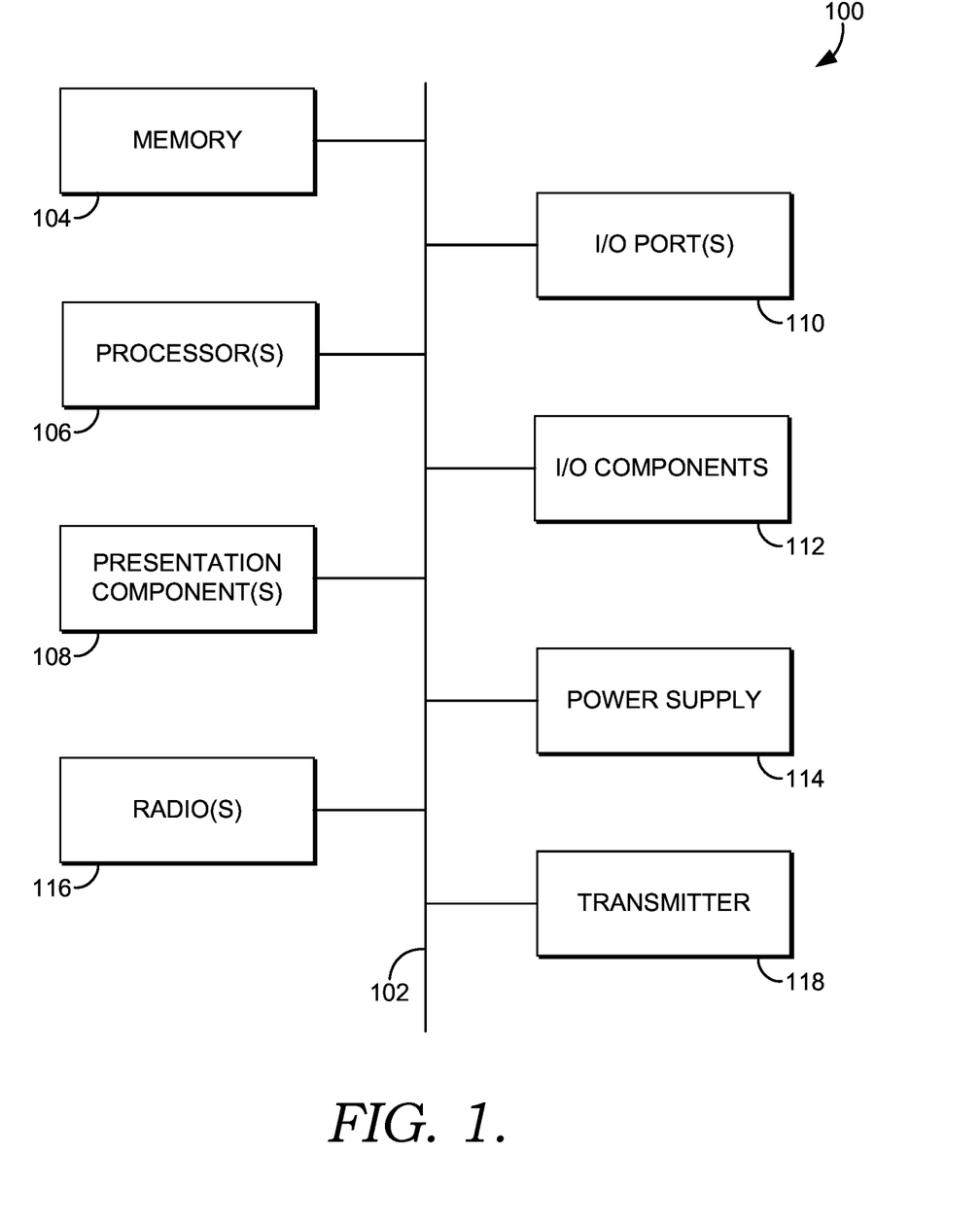
FIG. 1 depicts a diagram of an exemplary computing environment suitable for use in implementations of the present disclosure, in accordance with aspects herein.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, power supply 114, radio 116, and transmitter 118. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built into computing device 100. Illustrative I/O components 112 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
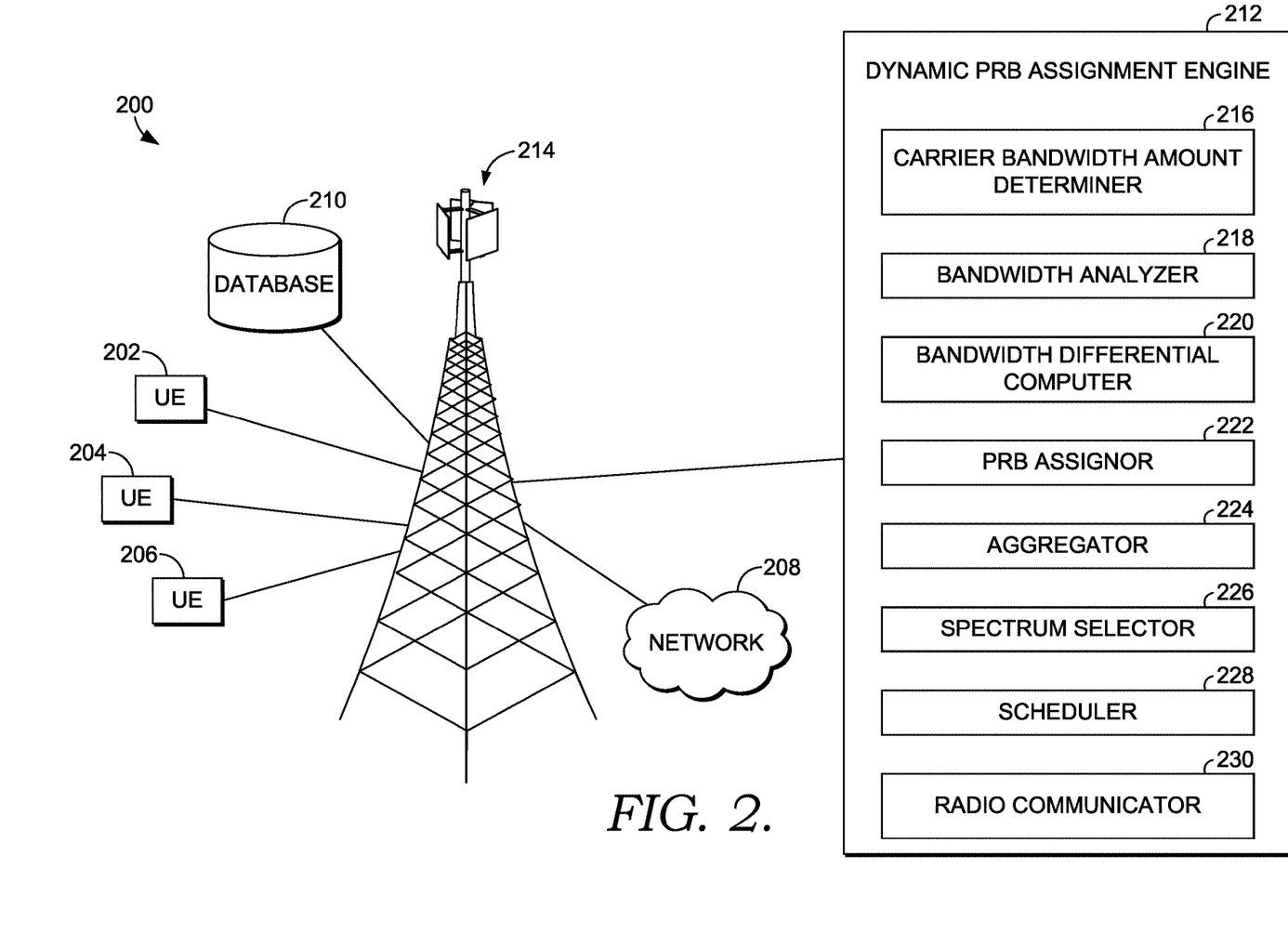
FIG. 2 illustrates a diagram of an exemplary network environment in which implementations of the present disclosure may be employed, in accordance with aspects herein.

Next, FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes UEs 202, 204, and 206, access point 214 (which may be a cell site, base station, or the like), network 208, database 210, and dynamic PRB assignment engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the UEs 202, 204, and 206 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, for example, a UE 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the UEs 202, 204, and 206 in network environment 200 can optionally utilize network 208 to communicate with other computing devices (e.g., a mobile device(s), a server(s), a personal computer(s), etc.) through access point 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as UE 202. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UE 202, that is located within the geographical area, or cell, covered by radio antennas of access point 214. Cell site or access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with dynamic PRB assignment engine 212, which comprises various components that are utilized, in various implementations, to assign PRBs based on available bandwidth where non-standard channel sizes may be present. In some implementations, dynamic PRB assignment engine 212 comprises components including a carrier bandwidth amount determiner 216, a bandwidth analyzer 218, a bandwidth differential computer 220, a PRB assignor 222, an aggregator 224, a spectrum selector 226, a scheduler 228, and a radio communicator 230. However, in other implementations, more or less components than those shown in FIG. 2 may be utilized to carry out aspects of the invention described herein.

The carrier bandwidth amount determiner 216 is configured to determine an amount of bandwidth that is carrier-owned or carrier-controlled. As mentioned, a carrier may own or control multiple sections within a spectrum. However, the portions or sections owned or controlled by a carrier may be contiguous or non-contiguous. Additionally, the un-owned or portions not controlled by the carrier may be controlled by a second carrier. For example, in an example spectrum that is 10 MHz in size, the carrier bandwidth amount determiner 216 will determine that a first carrier may own or control 7 Mhz of the 10 Mhz spectrum. Additionally, the carrier bandwidth amount determiner 216 will determine that the remaining 3 MHz is not owned or controlled by the first carrier. In some instances, the carrier bandwidth amount determiner 216 will determine only a first amount of bandwidth that is carrier-controlled. However, in other instances, the carrier bandwidth amount determiner 216 can determine additional amounts of bandwidth that are carrier-controlled (e.g. a second amount of bandwidth that is carrier-controlled, a third amount of bandwidth that is carrier-controlled, etc.). For example, if a 100 Mhz spectrum is present, the carrier bandwidth amount determiner 216 may determine a first amount of carrier-controlled bandwidth of 15 Mhz, a second amount of carrier-controlled bandwidth of 6 Mhz. If more than one amount of bandwidth that is carrier-controlled is present, then the carrier bandwidth amount determiner 216 will determine additional amounts of bandwidth that are carrier-controlled. In instances, any additional amounts of bandwidth that are carrier controlled and additional to the first amount of bandwidth may be located adjacent one another on the spectrum or may be located non-contiguously within the spectrum. Additionally, the carrier bandwidth amount determiner 216 is capable of also determining bandwidths within the spectrum that are not controlled or owned by the carrier and can identify the entity controlling or owning such additional bandwidths.

Once at least a first amount of bandwidth that is carrier-controlled is determined by the carrier bandwidth amount determiner 216, a bandwidth analyzer 218 determines a standardized bandwidth that is greater than the first amount of bandwidth. Standardized bandwidths are predetermined bandwidths that a carrier is provided with for selection. For example, the standard bandwidths may exist in increments of 5 MHz. As such, a list of standardized bandwidths available may include 5 MHz, 10 MHz, 15 Mhz, etc. While this example list includes bandwidths that begin with 5 Mhz and each additional standard bandwidth is in multiples of 5 MHz, it is contemplated that any other combination of standardized bandwidths may be available. For example, in other aspects, the standard bandwidths determined by the bandwidth analyzer 218 may be in increments of 10 Mhz, beginning with 10 Mhz and ending with 50 MHz depending on the size of the spectrum. The standardized bandwidth determined by the bandwidth analyzer 218 will be greater than the first amount of bandwidth. As such, if the first amount of bandwidth is determined by the carrier bandwidth amount determiner 216 to be 7 Mhz, then the standardized bandwidth determined by the bandwidth analyzer 218 would be the standardized bandwidth available that is larger than 7 Mhz. For example, the next larger standardized bandwidth may be 10 Mhz. In this case, the bandwidth analyzer 218 would determine that a 10 Mhz standardized bandwidth is greater than the 7 Mhz first amount of bandwidth that is carrier-controlled.

In instances in which there is a first amount of bandwidth and a second amount of bandwidth determined by the carrier bandwidth amount determiner 216, then the bandwidth analyzer 218 will determine a first standardized bandwidth that is greater than the first amount of bandwidth and a second standardized bandwidth that is greater than the second amount of bandwidth. For example, when the first amount of bandwidth is determined to be 15 Mhz, the bandwidth analyzer 218 will determine that the first standardized bandwidth that is greater than the first amount of bandwidth of 15 Mhz is 20 Mhz. Similarly, the bandwidth analyzer 218 will determine a second standardized bandwidth that is greater than the second amount of bandwidth. If the second amount of bandwidth that is carrier controlled was determined to be 6 Mhz, then the bandwidth analyzer 218 may determine that the second standardized bandwidth that is greater than the 6 Mhz second amount of bandwidth is 10 Mhz. The first amount of bandwidth, second amount of bandwidth, any additional bandwidth amounts, and any standardized bandwidths discussed herein are for example purposes only and non-limiting. It is contemplated that any combination of standardized bandwidths and carrier-controlled bandwidth amounts may be present depending on the spectrum and determinations by the spectrum governing body.

The bandwidth differential computer 220 computes the bandwidth differential after the first amount of bandwidth and the standardized bandwidth have been determined. The bandwidth differential is the difference between the standardized bandwidth and the first amount of bandwidth. Continuing with the same example, if the standardized bandwidth is determined to be 10 Mhz and the first amount of bandwidth was determined to be 7 Mhz, then the bandwidth differential computer 220 will determine that the bandwidth differential is 3 Mhz (10 Mhz-7 Mhz). The bandwidth differential computed by the bandwidth differential computer 220 may correspond to a second amount of bandwidth that is not carrier-owned or controlled. In instances, it is contemplated that the first amount of bandwidth (e.g. 7 Mhz) and the second amount of bandwidth (3 Mhz) are located adjacent to one another within a first spectrum. However, in other instances, the first amount of bandwidth and second amount of bandwidths may not be contiguous.

In cases where there is more than a first amount of bandwidth that is carrier controlled, the bandwidth differential computer 220 will determine a more than one bandwidth differential. Continuing with the example amounts above, if the first standardized bandwidth is determined to be 20 Mhz and the first amount of bandwidth controlled by the carrier is determined to be 15 Mhz, then the first bandwidth differential will be 5 Mhz. The bandwidth differential computer 220 would also calculate the bandwidth differential for the second amount of bandwidth that is carrier-controlled. As such, the bandwidth differential computer 220 would calculate that the difference between the second standardized bandwidth (10 Mhz) and the second amount of bandwidth that is carrier controlled is 4 Mhz.

Once the bandwidth differential is computed by the bandwidth differential computer 220, the PRB assignor 222 assigns PRBs corresponding to the first amount of bandwidth. However, the bandwidth differential is not assigned any PRBs. As such, the PRB assignor would assign PRBs corresponding to the 7 Mhz that is the first amount of bandwidth that is carrier controlled. The determined bandwidth differential of 3 Mhz will not be assigned any PRBs by the PRB assignor 222. As mentioned, previously, only 5 Mhz of the 7 Mhz of the first amount of bandwidth that is carrier-controlled would have been able to be assigned PRBs since 5 Mhz is one of the standard bandwidths.

Because new channel sizes require a lengthy process of approval from standard bodies, are expensive to implement on chipsets and software, and cause other complications, it would have been impossible for all 7 Mhz of the first amount of bandwidth that is carrier-controlled to have been allocated PRBs. This would have limited the carrier to only being able to have PRBs assigned to the 5 Mhz corresponding to the standardized bandwidth, even though the carrier controlled more 7 Mhz. By contrast, in the present system, all 7 Mhz of the first bandwidth that is carrier-controlled will be able to have PRB resources allocated, which results in the operator being able to utilize more of the carrier-controlled spectrum, increase speeds, and reduce the need for carrier aggregation. In this instance, bandwidth analyzer 218 would have determined that the standardized bandwidth should be 10 Mhz, rather than 5 Mhz, since 10 Mhz would have been the next larger standardized bandwidth that is greater than the 7 Mhz first amount of bandwidth. Additionally, no PRBs would be assigned by the PRB assignor 222 to the bandwidth differential or the 3 Mhz. As mentioned, the present disclosure would allow the carrier to utilize a greater amount of carrier-controlled bandwidth (7 Mhz) than it could have previously.

Returning to the example where more than a first amount of bandwidth that is carrier controlled is determined, the PRB assignor 222 will assign PRBs corresponding to both the first amount of bandwidth and the second amount of bandwidth that is carrier-controlled. In this case, the PRB assignor 222 would assign PRBs to the first amount of bandwidth (15 Mz) and the second amount of bandwidth (6 Mhz). However, the first bandwidth differential (5 Mhz) and the second bandwidth differential (4 Mhz) would not receive allocation of any PRBs.

Figure 3:
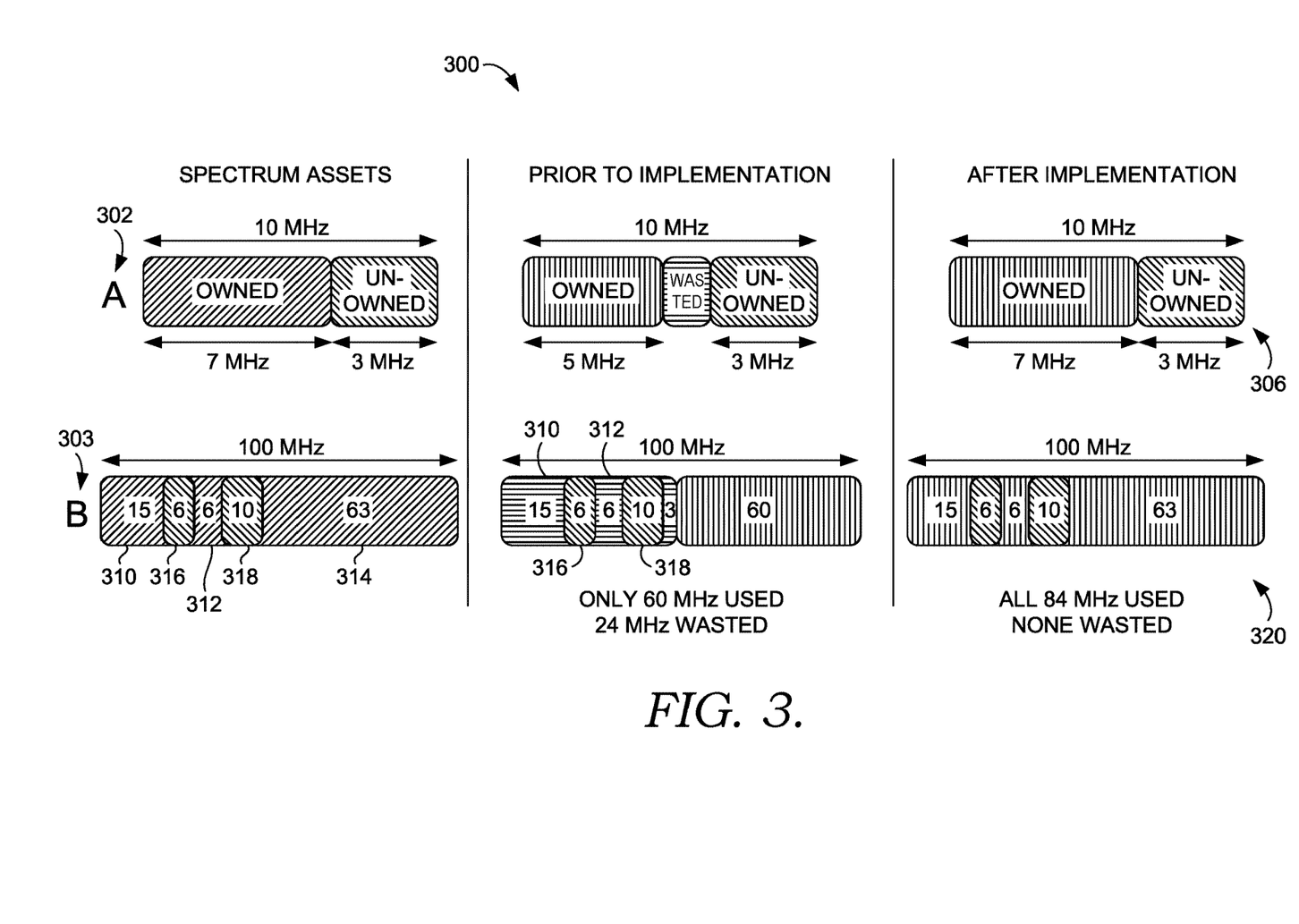
FIG. 3 illustrates how the use of the implementations of this disclosure allow for greater utilization of spectrum assets.

Additionally, in aspects, aggregator 224 may also aggregate the first amount and the second amount of bandwidths. This may occur when the first amount of bandwidth and the second amount of bandwidth that are carrier-controlled are non-contiguous portions of bandwidth. In other words, as seen in FIG. 3, if the first amount of bandwidth of 15 Mhz and the second amount of bandwidth of 6 Mhz are separated by a first amount of bandwidth that is not carrier-controlled (e.g. 15 MHz first bandwidth is located adjacent to 6 MHz of non-carrier controlled bandwidth which is then located adjacent to the second bandwidth of 6 MHz), the aggregator 224 will aggregate the first and second amounts of bandwidth that are carrier-controlled even though they are not located adjacent one another on the spectrum. Once again, the aggregation of the first amount and the second amount of bandwidth provides for greater utilization of the portion of the spectrum that is carrier controlled. It also increases speeds.

In some aspects, a spectrum selector 226 may select a first segment of spectrum that is available to a wireless carrier for wirelessly communicating with one or more user devices. The first segment of spectrum will have an first bandwidth, which is determined by the carrier bandwidth amount determiner 216. In other words, if the spectrum selector 226 selects segment A of 100 Mhz spectrum, the carrier bandwidth amount determiner 216 will determine that the size of the first bandwidth. For example, the first segment of the spectrum is determined to have a first bandwidth of 28 Mhz. In this case, the bandwidth analyzer 218 will determine that the first bandwidth 28 Mhz is between a lower standardized carrier bandwidth (e.g. 25 Mhz) and an upper standardized carrier bandwidth (e.g. 30 MHz). The bandwidth differential computer 220 will determine a first bandwidth differential between an upper standard carrier bandwidth (e.g. 30 Mhz) and the first amount of bandwidth 28 Mhz). The first bandwidth differential will be determined to be 2 Mhz (30 Mhz upper standardized carrier bandwidth minus the first amount of bandwidth—28 Mhz). The first bandwidth differential corresponds to a second segment of spectrum that is not available to the wireless carrier.

Once the bandwidth differential computer 220 computes the first bandwidth differential, the scheduler 228 schedules a plurality of PRBs for at least a portion of the first bandwidth (e.g. the scheduler may schedule a plurality of PRBs to all 28 Mhz of the first bandwidth amount or a portion such as 25 Mhz of the 28 Mhz of the first bandwidth). Additionally, the first bandwidth differential (2 Mhz) will not have any PRBs scheduled. Once scheduled, the communicator 230 will communicate the schedule of the plurality of PRBs to a radio component. The radio component will then wireless communicate the PRBs to one or more user devices.

Next, FIG. 3, illustrates an example illustration 300 comparing the improvements of the present disclosure in comparison to prior PRB allocation methods. First, Spectrum A illustrates 10 Mhz spectrum. Of the 10 Mhz of Spectrum A, 7 Mhz is determined to be carrier-owned or controlled and 3 Mhz is un-owned and unusable. As mentioned, in prior PRB allocation methods and systems, only 5 Mhz of the 7 Mhz could have had PRBs allocated since the first standardized bandwidth would have been 5 Mhz. By contrast, when the present systems and methods disclosed herein are implemented as shown at 306, the first standardized bandwidth that is greater than the first amount of bandwidth is determined. In this case, the first standardized bandwidth greater than the first amount of bandwidth would be a 10 Mhz standardized bandwidth. The bandwidth differential computer 220 would compute the bandwidth differential between the first standardized bandwidth (10 Mhz) and the first amount of bandwidth (7 Mhz). In this case, the first bandwidth differential would be 3 Mhz. As shown at 306, the PRB assignor 222 would then assign PRBs to 7 Mhz or the first amount of bandwidth but not assign any PRBs to the first bandwidth differential or the 3 Mhz. As illustrated, this allows a greater amount of the carrier-owned spectrum to be utilized as 7 Mhz can be assigned PRBs instead of being limited to only assigning PRBs to the 5 Mhz. In the previous instances, 2 Mhz of the 7 Mhz first amount of bandwidth that is carrier controlled would have remained wasted and unused. However, the present disclosure provides systems and methods for increasing the utilization of the carrier owned spectrum such that all of the first amount of bandwidth that is carrier-controlled shown at 306 will be assigned PRBs.

As mentioned, in some instances, there may be more than one amount of bandwidth that is carrier controlled. As shown by Spectrum B 303 in FIG. 3, a first amount 310 (15 Mhz), a second amount 312 (6 MHz), and a third amount 314 (63 Mhz) are designated as carrier-controlled. Unowned portions 316 (6 Mhz) and 318 (10 Mhz) are also present in spectrum B. Additionally, as seen, the first amount of bandwidth 310, second amount of bandwidth 312, and third amount of bandwidth 314 that are carrier-controlled are non-contiguous and separated by the unowned portions 316 and 318. Previously, due to the limitations of assigning PRBs, only the third amount of bandwidth 314 would have been used since the 60 Mhz would have corresponded to a standardized bandwidth. As such, 3 Mhz of the 63 Mhz first amount of bandwidth would not have been utilized in any way. This would have left first amount of bandwidth 310 and second amount of bandwidth 312 unused and wasted as well. Therefore, of the 84 Mhz in total that is carrier-controlled in Spectrum B 303, only 60 Mhz would have been utilized.

By contrast, when the features of the present disclosure are implemented in Spectrum B 303, it results in the use of all 84 Mhz in Spectrum B 303 that are carrier-controlled. More specifically, the carrier bandwidth amount determiner 216 will determine the first amount of bandwidth 310 (15 Mhz), second amount of bandwidth 312 (6 Mhz) and third amount of bandwidth 314 (63 Mhz) that is carrier controlled. The bandwidth analyzer 218 will determine a first standardized bandwidth that is greater than the first amount of bandwidth (e.g. 20 Mhz), a second standardized bandwidth that is greater than the second amount of bandwidth (e.g. 10 Mhz) and a third standardized bandwidth that is greater than the third amount of bandwidth (e.g. 65 MHz). The bandwidth analyzer 2118 may determine the best standardized bandwidth to be 100 MHz, which covers the first amount of bandwidth 310, the second amount of bandwidth 213, and the third amount of bandwidth 314. Of this 100 MHz carrier, the PRBs belonging to the two unowned spectrum blocks would all belong to the bandwidth differential and would not be scheduled. The bandwidth differential includes a determined amount of spectrum (e.g. 3 MHz) and all the resources (e.g. PRBs) associated with the unowned spectrum. By assigning PRBs corresponding to the first amount of bandwidth 310, second amount of bandwidth 312, and third amount of bandwidth 314 that are carrier-controlled only and then aggregating the first amount of bandwidth 310, second amount of bandwidth 312, and third amount of bandwidth 312 that are noncontiguous portions within Spectrum B 303, all 84 MHz that are carrier controlled will be utilized as shown at 320 and there will be no wasting of resources as there would have been in prior implementations, where the first amount 310, second amount 312, and a portion of the third amount (3 Mhz) 314 would have been wasted, resulting in a waste of 24 Mhz and usage of only 60 Mhz.

Figure 4:
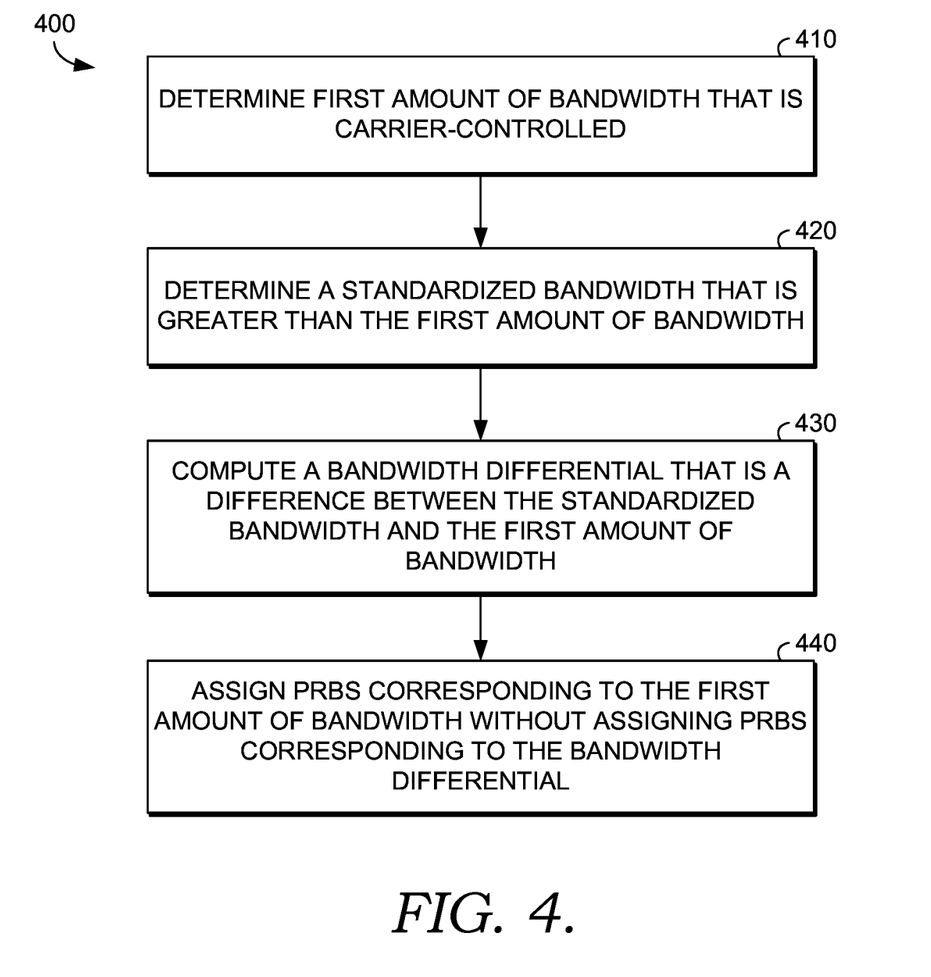
FIG. 4 depicts a flow diagram of a method of assigning physical resource blocks based on available bandwidth, in accordance with aspects herein.

FIG. 4 depicts a flow diagram of an exemplary method 400 for dynamically assigning PRBs based on available bandwidth. Initially, at block 410, the first amount of bandwidth that is carrier controlled is determined. Then, at block 420, a standardized bandwidth that is greater than the first amount of bandwidth is determined. Based on that, a bandwidth differential is computed at block 430. The bandwidth differential is the difference between the standardized bandwidth and the first amount of bandwidth. Following this, at block 440, PRBs are assigned corresponding to the first amount of bandwidth and no PRBs are assigned to the bandwidth differential.

Figure 5:
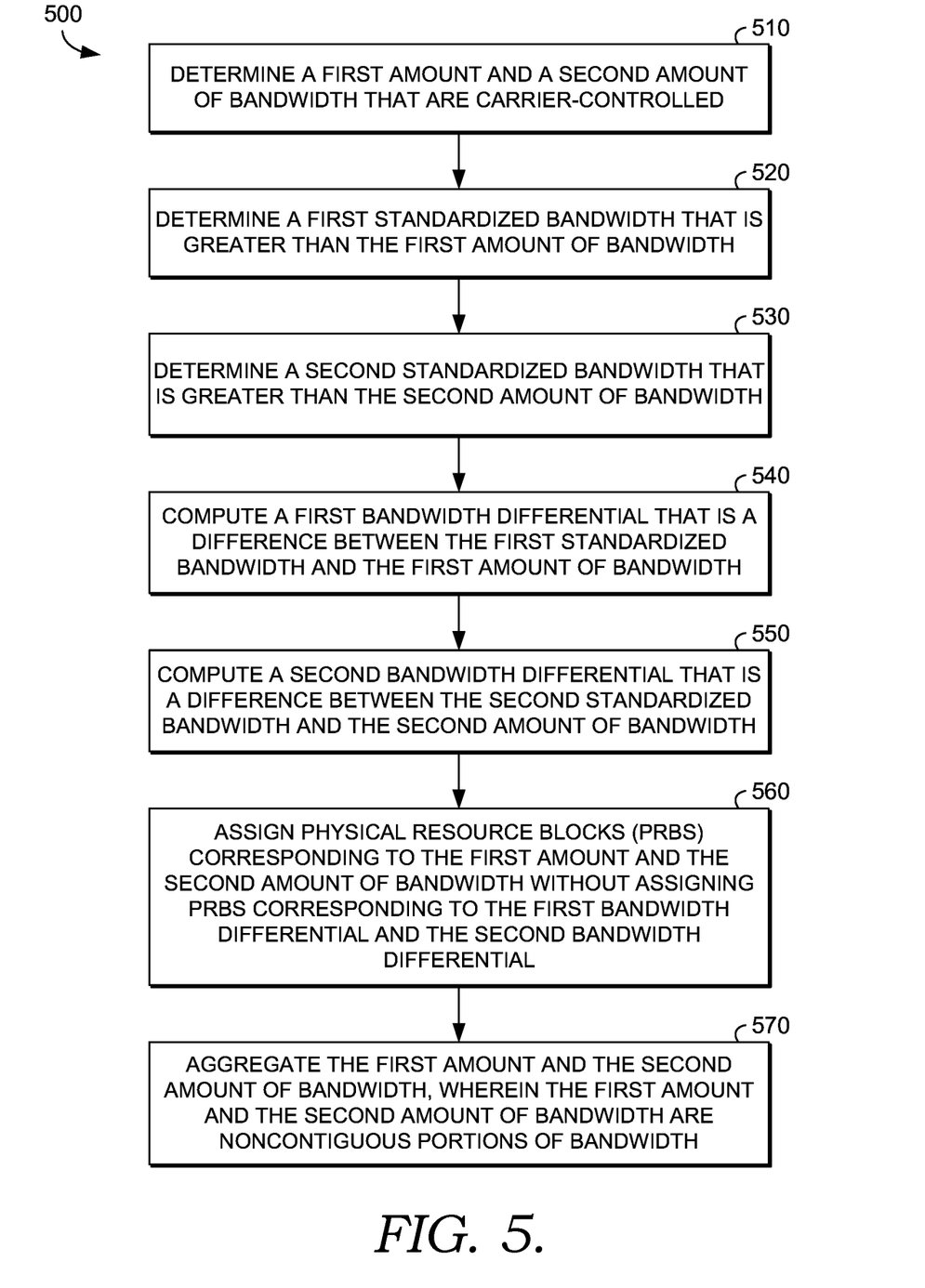
FIG. 5 depicts a flow diagram of another method of assigning physical resource blocks based on available bandwidth, in accordance with aspects herein.

FIG. 5 depicts another flow diagram of another example method 500 for assigning PRBs based on available bandwidth. In method 500, a first amount and a second amount of bandwidth that are carrier-controlled are determined at block 510. Then, at block 520, a first standardized bandwidth that is greater than the first amount of bandwidth is determined for the first amount of bandwidth. Similarly, at block 530, a second standardized bandwidth that is greater than the second amount of bandwidth is determined for the second amount of bandwidth. Then, a first bandwidth differential that is a difference between the first standardized bandwidth and the first amount of bandwidth at block 540. A second bandwidth differential that is a difference between the second standardized bandwidth and the second amount of bandwidth is also computed at block 550. Based on such computations, PRBs corresponding to the first amount and the second amount of bandwidth are assigned without assigning PRBs corresponding to the first bandwidth differential and the second bandwidth differential at block 560. Then the first amount and the second amount of bandwidth are aggregated at block 570, and the first amount and the second amount of bandwidth are noncontiguous portions of bandwidth.

Figure 6:
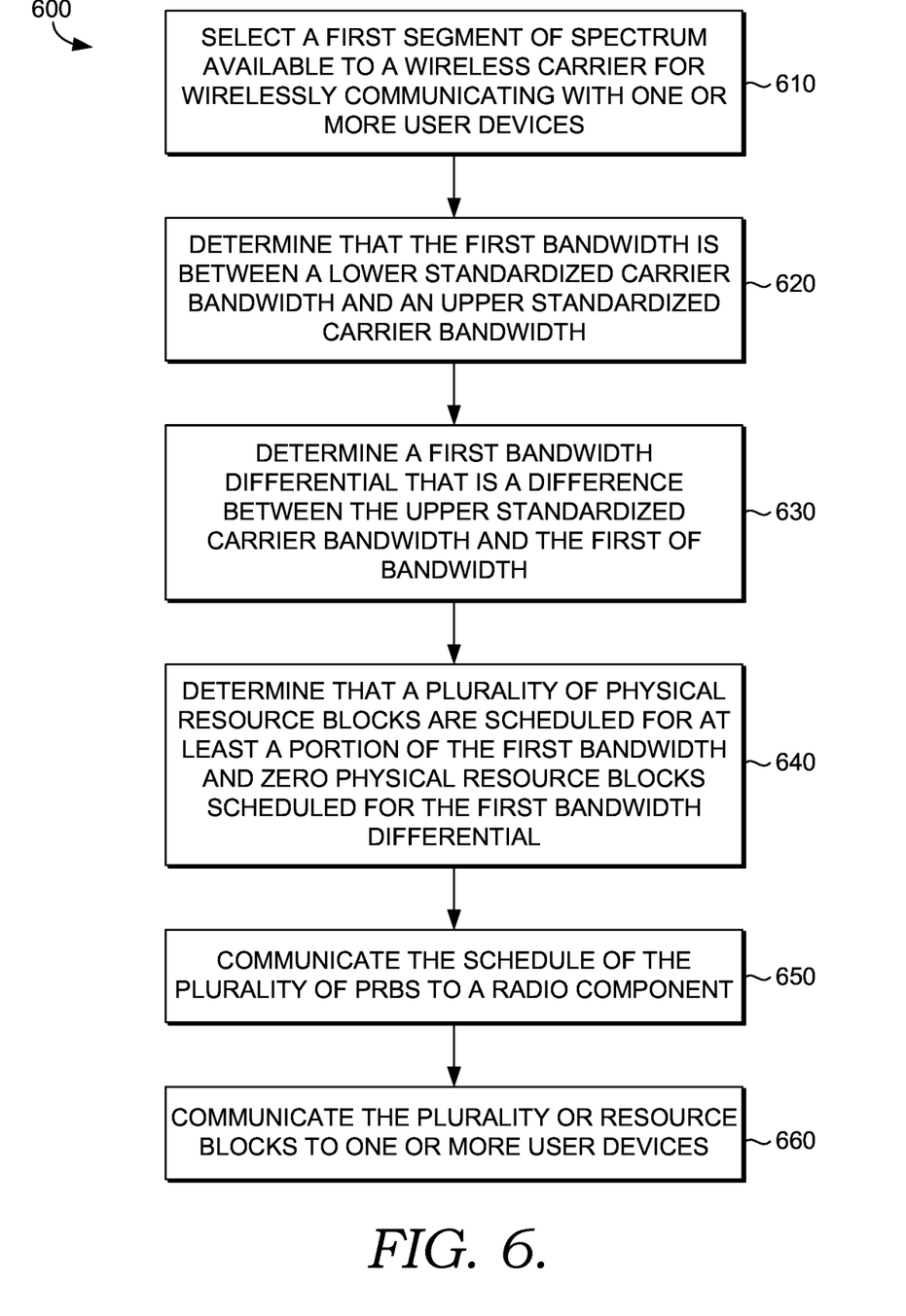
FIG. 6 depicts a flow diagram of yet another method of assigning physical resource blocks based on available bandwidth, in accordance with aspects herein.

FIG. 6 illustrates an example flow diagram of another method 600 for scheduling PRBs in non-standardized channel sizes. As shown, method 600 begins when a scheduling component selects a first segment of spectrum available to a wireless carrier for wirelessly communicating with one or more user devices at block 610. Then, it is determined that the first bandwidth is between a lower standardized carrier bandwidth and an upper standardized carrier bandwidth at block 620. Following this, a first bandwidth differential that is a difference between the upper standardized carrier bandwidth and the first of bandwidth is determined at block 630. Based on such determinations, a plurality of physical resource blocks are scheduled for at least a portion of the first bandwidth and no physical resource blocks are scheduled for the first bandwidth differential at block 640. The schedule of the plurality of PRBs is communicated to a radio component at block 650 and then the radio component wirelessly communicates the plurality or resource blocks to one or more user devices at block 660.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for assigning physical resource blocks (PRBs) based on available bandwidth, the method comprising:

selecting a first segment of a spectrum available for wireless communication;
determining a first amount of bandwidth and a second amount of bandwidth;
determining a first standardized bandwidth that is greater than the first amount of bandwidth;
determining a second standardized bandwidth that is greater than the second amount of bandwidth;
computing a first bandwidth differential that is a difference between the first standardized bandwidth and the first amount of bandwidth;
computing a second bandwidth differential that is a difference between the second standardized bandwidth and the second amount of bandwidth;
determining that the first bandwidth differential and second bandwidth differential are part of a second segment not available for wireless communication;
assigning PRBs corresponding to the first amount of bandwidth without assigning PRBs corresponding to the first bandwidth differential;
assigning PRBs corresponding to the second amount of bandwidth without assigning PRBs corresponding to the second bandwidth differential;
aggregating the first amount and the second amount of bandwidth, wherein the first amount and the second amount of bandwidth are noncontiguous portions of bandwidth.

2. The method of claim 1, wherein the standardized bandwidth is 10 MHz.

3. The method of claim 1, wherein the first amount of bandwidth is 7 MHz.

4. The method of claim 1, wherein the computed bandwidth differential is 3 MHz.

5. The method of claim 1, wherein zero PRBs are assigned to the bandwidth differential.

6. The method of claim 1, wherein PRBs associated with the first bandwidth are assigned.

7. The method of claim 1, further comprising determining one or more PRBs that cannot be utilized.

8. The method of claim 1, wherein the first standardized bandwidth is one or more of 5 MHz, 10 MHZ, 15 MHz, and 20 MHz.

9. A method for assigning physical resource blocks (PRBs) based on available bandwidth, the method comprising:
selecting a first segment of a spectrum available for wireless communication;
determining a first amount and a second amount of bandwidth that are carrier-controlled;
for the first amount of bandwidth, determining a first standardized bandwidth that is greater than the first amount of bandwidth;
for the second amount of bandwidth, determining a second standardized bandwidth that is greater than the second amount of bandwidth;
computing a first bandwidth differential that is a difference between the first standardized bandwidth and the first amount of bandwidth;
computing a second bandwidth differential that is a difference between the second standardized bandwidth and the second amount of bandwidth;
determining that the first and second bandwidth differential correspond to a second segment, wherein the second segment is not available for wireless communication;
assigning physical resource blocks (PRBs) corresponding to the first amount and the second amount of bandwidth without assigning PRBs corresponding to the first bandwidth differential and the second bandwidth differential;
aggregating the first amount and the second amount of bandwidth, wherein the first amount and the second amount of bandwidth are noncontiguous portions of bandwidth;
determining at least one amount of bandwidth that is not carrier controlled; and
identifying a controlling entity for the at least one mount of bandwidth that is not carrier-controlled.

10. The method of claim 9, wherein the first standardized bandwidth and second standardized bandwidth are one or more of 5 MHz, 10 MHZ, 15 MHz, and 20 MHz.

11. The method of claim 9, wherein the first standardized bandwidth and the second standardized bandwidth include all carrier-controlled bandwidths within a spectrum.

12. The method of claim 9, wherein the first bandwidth differential and the second bandwidth differential correspond to bandwidth not controlled by the carrier.

13. A system for scheduling physical resource blocks (PRBs) in nonstandard channel sizes, the system comprising:
a scheduling component configured to perform operations comprising:
selecting a first segment of spectrum available to a wireless carrier for wirelessly communicating with one or more user devices, the first segment of spectrum having a first bandwidth;
selecting a second segment of spectrum available to a wireless carrier for wirelessly communicating with one or more user devices, the second segment of spectrum having a second bandwidth;
determining that the first bandwidth is between a lower standardized carrier bandwidth and an upper standardized carrier bandwidth;
determining that the second bandwidth is between a lower standardized carrier bandwidth and an upper standardized carrier bandwidth;
determining a first bandwidth differential that is a difference between the upper standardized carrier bandwidth and the first of bandwidth;
determining a second bandwidth differential that is a difference between the upper standardized carrier bandwidth and the first of bandwidth;
determining that the first bandwidth differential corresponds to a third segment, wherein the third segment is not available for wireless communication and is not carrier-controlled;
determining that the second bandwidth differential corresponds to a fourth segment, wherein the fourth segment is not available for wireless communication and is not carrier-controlled;
scheduling a plurality of physical resource blocks for at least a portion of the first bandwidth and second bandwidth and no physical resource blocks for the first bandwidth differential and the second bandwidth differential;
aggregating the first bandwidth and the second bandwidth, wherein the first bandwidth and the second bandwidth are noncontiguous portions of bandwidth;
communicating the schedule of the plurality of physical resource blocks to a radio component;
determining at least one amount of bandwidth that is not carrier controlled; and
identifying a controlling entity for the at least one mount of bandwidth that is not carrier-controlled.

14. The system of claim 13, wherein the first bandwidth is 7 MHz.

15. The system of claim 14, wherein the lower standardized carrier bandwidth is 5 MHz and the upper standardized carrier bandwidth is 10 MHz.

* * * * *

UNITED STATES PATENT AND TRADEMARK OFFICE
CERTIFICATE OF CORRECTION

| | | |
|---|---|---|
| PATENT NO. | : 11,943,171 B2 | Page 1 of 1 |
| APPLICATION NO. | : 17/563363 | |
| DATED | : March 26, 2024 | |
| INVENTOR(S) | : Daniel Stewart Broyles and Nagi A. Mansour | |

It is certified that error appears in the above-identified patent and that said Letters Patent is hereby corrected as shown below:

In the Claims

Column 16, Claim 9, Line 10: In the line reading "one mount of" should read --one amount of--.

Column 16, Claim 13, Line 66: In the line reading "one mount of" should read --one amount of--.

Signed and Sealed this
Twenty-eighth Day of May, 2024

Katherine Kelly Vidal
Director of the United States Patent and Trademark Office